Sept. 22, 1953      C. A. HUMPHRIES      2,652,815
VAPOR FEEDING DEVICE FOR INTERNAL-COMBUSTION ENGINES
Filed Aug. 25, 1949      2 Sheets-Sheet 1
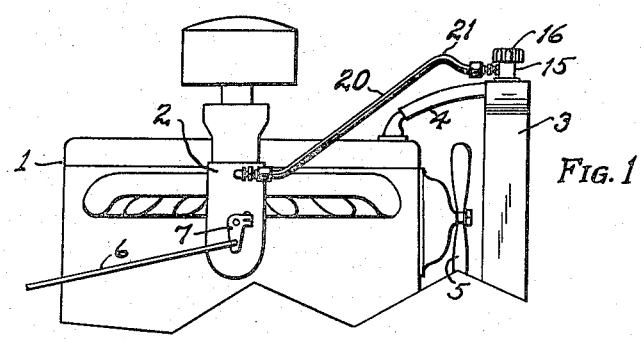
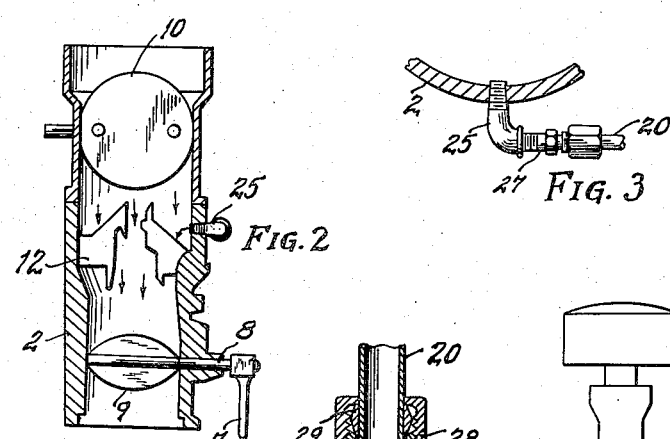
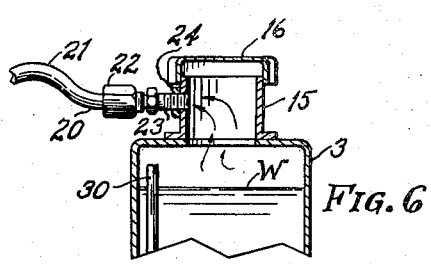
INVENTOR.
CHARLES A. HUMPHRIES,
BY

INVENTOR.
CHARLES A. HUMPHRIES,

Patented Sept. 22, 1953

2,652,815

UNITED STATES PATENT OFFICE 2,652,815

VAPOR FEEDING DEVICE FOR INTERNAL-COMBUSTION ENGINES

Charles A. Humphries, Cleveland, Ohio, assignor to Humphries Automotive Improvement Corporation, Cleveland, Ohio, a corporation of Ohio Application August 25, 1949, Serial No. 112,195

3 Claims. (Cl. 123—25)

This invention relates to means for supplying vapor to the carburetors of internal combustion engines.

It has been well known that supplying moisture to the air being mixed with the fuel for internal combustion engines is beneficial in a number of respects. Supplementary injector devices for intermittant injection of a small stream of water or supplementary fuel are well known and accomplish some of the desired results of assuring a high content of moisture in the combustible mixture. Broadly, the object of my invention, however, is to supply water vapor to the intake passage of the carburetor at all times and in proportion to the air and fuel intake for the combustible mixture.

Experience has demonstrated that with the use of my device the mileage per gallon of gasolene is increased. Accumulation of carbon and sludge in the engine is reduced. The motor has been found to run cooler, that is, to maintain lower temperature at all speeds, and economy of lubricating oil is effected.

The device is particularly applicable to internal combustion engines of the water cooled type, having a radiator, and, more specifically, an object is to provide a simple effective connection for drawing off the vapor from above the water level of the heated water of the radiator in the desired amount, and bringing such vapor to the carburetor in proportion to the volume of air and fuel comprising the combustible mixture, and at all times during the operation of the engine.

Specific objects of the invention include prevention of the drawing of solid water to the passage from the radiator to the carburetor, and the prevention of backfire reaching the radiator and igniting gases therein, which may be present due to anti-freeze content such as alcohol.

Modifications of the invention include physically controlling the vapor passage by connections with the throttle mechanism of the carburetor.

Other objects will become apparent in the following description which relates to the accompanying drawings illustrating the preferred embodiments, and in which:

Fig. 1 is a side elevation of the upper portion of an automobile engine showing the usual radiator and my vapor passage connection from it to the carburetor;

Fig. 2 is a vertical section through the carburetor showing the vapor connection leading to the interior of the air intake passage;

Fig. 3 is a horizontal sectional detail on a slightly enlarged scale, showing this connection and connection containing a cleaning and backfire preventing screen;

Fig. 4 is an enlarged sectional detail of a connection shown in Fig. 3;

Fig. 5 is a side elevation of the carburetor and throttle connections to a controlling valve for the vapor passage;

Fig. 6 is an enlarged sectional detail showing the upper portion of the conventional radiator with the vapor passage connection at the conventional filling opening;

Figure 7:
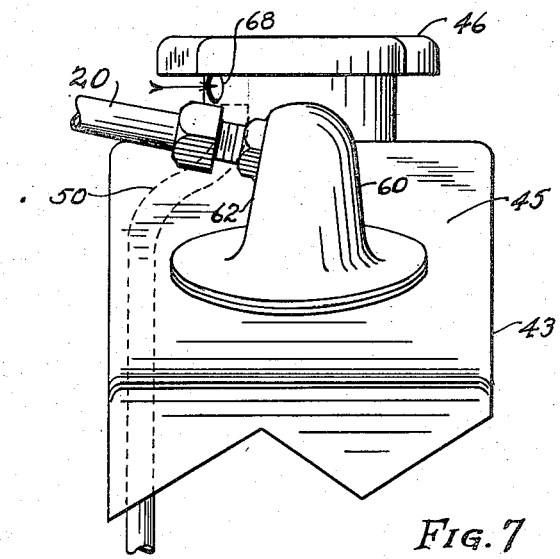
Fig. 7 is an elevation showing a modified form of the radiator connection fitted to the top wall of a radiator.

Referring to the parts by the use of reference characters, I designates a motor or engine which is illustrative of any internal combustion engine, such as an automobile motor, having the usual carburetor 2 and connected with the usual radiator by the pipe 4; 5 indicating the cooling fan behind the radiator.

The throttle rod 6 is connected with the lever 7 for operating the shaft 8 carrying the butterfly throttle valve 9.

In Fig. 2 the choke butterfly valve is shown at 10 above the mixing Venturi throat 12.

As appears in Figs. 1 and 6, the upper wall of the radiator is provided with the usual cylindrical neck 15 for the filling opening, and onto which is fitted the radiator cap 16. One form of my invention is adapted to be fitted to this conventional arrangement and for this purpose I provide a tube 20 connected through suitable fittings 22 with a nipple 23 threaded into an opening at the rear and upper portion of the neck 15 and secured by a lock nut 24, or other suitable means.

The tube 20 extends first rearwardly and upwardly as at 21, and then downwardly to another fitting connecting the end of it with an elbow or like connection 25 threaded into an opening in the side of the carburetor 2, preferably above the Venturi throat. The connections between the end of the tube 20 and the member 25 may include the fitting arrangement shown in Fig. 4 which forms a special union in which may be mounted a screen 26.

As shown in Fig. 4 a nipple member 27 is threaded at one end to fit the street-L and threaded at its other end to receive a collar 28 adapted to be tightened onto a sealing ring 29 to secure the end of the tube 20.

The function of the screen 26 is twofold in that it not only serves as a screen or filter but also prevents the flame of backfire from traveling along the passage 20 with a possibility of igniting fumes of anti-freeze, such as alcohol in the radiator.

The water level is the radiator, as is well known, is normally limited by the upper end of the overflow pipe 30, and may stand at any level, as indicated at W in Fig. 6, leaving an air space above the water and within the filling opening. As the air is drawn into the carburetor and mixed with the gasoline or other fuel, the partial vacuum draws a considerable portion of air through the passage 20, picking up a very appreciable amount of vapor which passes, as indicated at the arrows in Fig. 6, into the tube and commingles the combustible mixture in the motor.

When the radiator is being filled there is likelihood of some solid water entering the tube 20; and in the form just described it is normally prevented from flowing downwardly to the carburetor by the raised portion 21, causing it to drain back into the radiator which, under ordinary circumstances, is being filled when the motor is not running.

There are occasions when it is desired to diminish or shut off the suction from the radiator to the carburetor, and likewise there are conditions in which it may be desired to control the flow of vapor from the radiator to the carburetor. For this purpose I may arrange a valve 32 in the passage 20 which may be operated by a short lever arm 33, connected by a link 34 with an extension 7a of the throttle valve lever 7.

It will be seen that as the throttle rod and lever 6 and 7 are moved, the valve 33 may be opened or closed correspondingly, thus controlling the flow of vapor, and which may be adjusted so that the volume of flow through the pipe 20 will be somewhat commensurate with conditions under which the engine is running.

In many motor vehicles of recent design the radiator filling opening has a very short neck and does not lend itself to the arrangement just described.

Furthermore, there is a problem of preventing solid water entering the vapor pipe leading to the carburetor.

Figure 8:
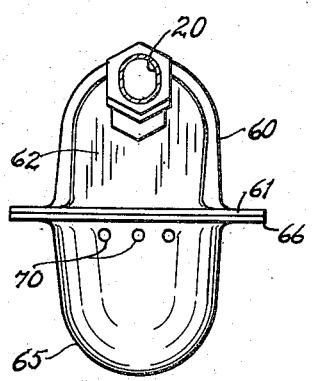
Fig. 8 is an elevation showing the fitting for the top of the radiator.
Figure 9:
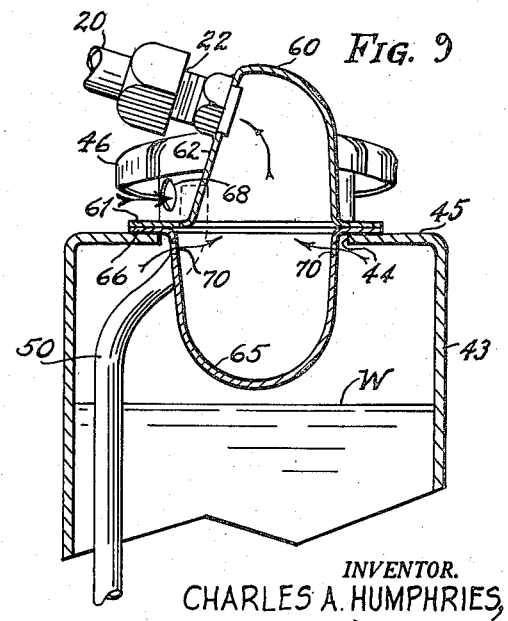
Fig. 9 is a sectional view through the fitting and upper portion of the radiator.

A satisfactory design for such radiators, and which is simple to install and effective in use, is illustrated in the form shown in Figs. 7, 8 and 9. In these figures the radiator 43 is shown as having a large opening 44 made in the high portion of the top wall 45 at one side of the radiator filling neck with its cap 46. There is usually some transverse crown or slope to the top wall 45, as appears in Fig. 7. That is, in Fig. 7 the top wall is shown sloping toward the eye, and in Fig. 9 the fitting now to be described is shown at the top of the view, and the radiator cap is slightly tilted away from the eye.

The overflow pipe 50 is shown as having its upper end extending up into the filling opening, and the water level is therefore recommended to be kept down from the top for satisfactory results, preferably at a level indicated at W in Fig. 9.

Whatever this lever, however, there is splash and surge, and it becomes desirable to provide a means for normally preventing water splashing directly into the intake opening for the tube 20.

To this end I have designed a special device comprising a dome-shaped member 60 having a flange 61 extending outwardly from its open lower side, and having a flattened surface 62 through which the opening is made for the fitting 22 for the tube 20. A somewhat similar dome-shaped member 65 is provided with a flange 66, preferably of the same diameter, and which is welded, brazed or otherwise secured to the flange 61, and when in position is likewise secured to the top wall 45 while the dome 65 projects through the opening 44 in the top wall 45.

In order to admit the desired volume of vapor-laden air to the chamber formed by these two dome members, and thus to the passage to the carburetor while excluding water therefrom, I provide an opening through which the vapor may pass, as indicated by the arrows in Fig. 9. As shown, a plurality of openings 70, preferably located just below the flange 66, may comprise a total area equal to that of the opening through the vapor tube or passage 20. The location of the openings is such that as water surges in the radiator, which surge is largely from side to side, it is deflected from these openings and is thus prevented from being sucked directly in through them. Furthermore, even if some water accumulates in the lower dome 65, it is still remote from the entrance to the passage 20 in the upper dome.

As vapor-laden air is drawn from the chamber at the top of the radiator, it must, of course, be replaced, and normally the overflow pipe 30 or the pipe 50 admits air to the chamber above the water and which there picks up vapor from the warm or hot water before passing to the pipe 20 and to the carburetor. However, such overflow or vent pipes sometimes become clogged, and it is desirable to assure circulation through the top of the radiator by providing an additional intake or vent opening which may be located in a protected position, as indicated at 68. Here it admits air through the filling opening neck and beneath the cap, and such inlet air is thus admitted at a point some distance from the openings 70, assuring circulation within the space above the water and correspondingly the picking up of vapor before passing to the carburetor.

From the foregoing description it will be seen that I have provided a device which is capable of being readily installed on any automobile or truck; and experience has demonstrated with private users, taxicab and truck fleets, and others, a marked improvement in gasoline mileage economy, and the other motor conditions above mentioned are attained.

Having thus described my invention, what I claim is:

1. A device adapted for connection to the space above the water in the radiator of the motor for automobiles and the like and for leading vapor from said space to the intake passage of the carburetor, said device comprising a tubular connection leading to the carburetor from the upper portion radiator, and including a chamber member at the intake end thereof, the chamber member being provided with surfaces projecting downwardly into the top of the radiator and having openings therethrough and serving to deflect water away from the openings.

2. A vapor supplying device for use in combination with a water-cooled internal combustion motor having a water-cooling radiator including a closed chamber above the water, a tubular connection between said chamber and the fuel intake passage of the motor including a hollow member forming a chamber having openings communicating with the interior of the radiator and connected with the tubular passage at a point above the top of the radiator, the chamber from which the carburetor passage leads comprising two dome-like members secured together and having a supporting flange fitting around an opening formed in the radiator top, the lower dome-like member having a plurality of intake openings adjacent the top thereof and of a composite area comparable to the cross-sectional area of the passage leading to the carburetor.

3. A device such as defined in claim 2 in which the tubular connection includes a transverse screen serving as a filter and to prevent backfire traveling along the passage to the chamber above the water.

CHARLES A. HUMPHRIES.

References Cited in the file of this patent

UNITED STATES PATENTS

| Number | Name | Date |
| --- | --- | --- |
| 1,277,796 | Watters | Sept. 3, 1918 |
| 1,301,707 | Keitel | Apr. 22, 1919 |
| 1,377,608 | Taylor | May 10, 1921 |
| 1,526,262 | Williams | Feb. 10, 1925 |
| 1,542,301 | Jones | June 16, 1925 |
| 1,595,704 | Caldwell | Aug. 10, 1926 |
| 1,624,838 | Lipinski | Apr. 12, 1927 |
| 1,766,363 | Smith | June 24, 1930 |
| 1,784,725 | Gustafson | Dec. 9, 1930 |
| 2,108,556 | Hardt | Feb. 15, 1938 |